(12) United States Patent
Roessel et al.

(10) Patent No.: US 9,191,925 B2
(45) Date of Patent: Nov. 17, 2015

(54) CONTROLLING UE EMISSIONS FOR AVOIDING SELF-INTERFERENCE AND FOR DEMANDING COEXISTENCE SITUATIONS

(75) Inventors: Sabine Roessel, München (DE); Mikko Pesola, Märynummi (FI); Petri Vasenkari, Turku (FI); Esa Tapani Tiirola, Kempele (FI); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/260,999

(22) PCT Filed: Mar. 31, 2009

(86) PCT No.: PCT/EP2009/053839
§ 371 (c)(1),
(2), (4) Date: Dec. 12, 2011

(87) PCT Pub. No.: WO2010/112066
PCT Pub. Date: Oct. 7, 2010

(65) Prior Publication Data
US 2012/0075989 A1   Mar. 29, 2012

(51) Int. Cl.
*H04W 72/04* (2009.01)
*H04W 52/14* (2009.01)
(Continued)

(52) U.S. Cl.
CPC ............ *H04W 72/04* (2013.01); *H04W 52/146* (2013.01); *H04W 52/243* (2013.01); *H04W 52/367* (2013.01); *H04W 72/082* (2013.01)

(58) Field of Classification Search
CPC . H04W 72/04; H04W 72/082; H04W 52/146; H04W 52/243; H04W 52/367
USPC ......... 370/203, 208, 310, 328, 329, 343, 344; 455/450–454
See application file for complete search history.

(56) References Cited

U.S. PATENT DOCUMENTS

2009/0168718 A1\* 7/2009 Wang et al. .................... 370/330
2009/0247166 A1\* 10/2009 Luo et al. ...................... 455/436
(Continued)

FOREIGN PATENT DOCUMENTS

EP          1 956 771 A2    8/2008
WO     WO 2009/035983 A1    3/2009

OTHER PUBLICATIONS

3GPP TS36.101 V8.4.0 (Dec. 2008) 3rd Generation Partnership Project; Technical Specification Group Radio Access Network; Evolved Universal Terrestrial Radio Access (E-UTRA); User Equipment (UE) radio transmission and reception (Release 8), (91 pages).
R4-080708 3GPP TSG RAN WG4 (Radio) Meeting #46bis Shenzhen, P. R. China Mar. 31-Apr. 5, 2008; Motorola; Impact of UE Self-interference on LTE FD-FDD operation, (16 pages).
(Continued)

*Primary Examiner* — Paul H Masur
(74) *Attorney, Agent, or Firm* — Harrington & Smith

(57) ABSTRACT

An apparatus, with a scheduler that allocates one or more resource blocks to a channel in an uplink frequency band and/or a downlink frequency band according to a first telecommunication standard and the available frequency band for the uplink or downlink, respectively, wherein the scheduler takes into account a limit of resource blocks to be allocated to the channel, and wherein the limit is at least one of an allowed resource block, a resource block to be avoided, a width of a range of allowed resource blocks, a non-usage information of the channel, an upper allowed resource block, and a lower allowed resource block, an upper limit of the number of resource blocks, a lower limit of the number of resource blocks, and any reasonable combinations of the limits mentioned.

20 Claims, 11 Drawing Sheets

(51) Int. Cl.
*H04W 52/24* (2009.01)
*H04W 52/36* (2009.01)
*H04W 72/08* (2009.01)

(56) References Cited

U.S. PATENT DOCUMENTS

| | | | |
|---|---|---|---|
| 2009/0290549 A1* | 11/2009 | Tiirola et al. | 370/329 |
| 2009/0312008 A1* | 12/2009 | Lindoff et al. | 455/423 |
| 2010/0029289 A1* | 2/2010 | Love et al. | 455/450 |
| 2010/0135173 A1* | 6/2010 | Tynderfeldt et al. | 370/252 |
| 2010/0216473 A1* | 8/2010 | Kazmi et al. | 455/436 |
| 2010/0246505 A1* | 9/2010 | Chong et al. | 370/329 |
| 2010/0296451 A1* | 11/2010 | Li et al. | 370/328 |
| 2012/0106517 A1* | 5/2012 | Charbit et al. | 370/336 |

OTHER PUBLICATIONS

R4-080312; 3GPP TSG RAN WG4 (Radio) Meeting #46 R4-080312 Sorrento, Italy Feb. 11 to Feb. 15, 2008; Motorola; TS36.101: E-UTRA UE additional channel bandwidth, (4 pages).

R4-080352, TSG-RAN Working Group 4 (Radio) meeting #46 Sorrento, Italy, Feb. 11-15, 2008, Support of 10 MHz channel for Bands V, VI and VIII, (3 pages).

R4-082971 TSG-RAN Working Group 4 (Radio) meeting #49 Prague, Czech Republic, Nov. 10-14, 2008; Ericsson; Maximum sensitivity degradation for various bands, (3 pages).

U.S. Appl. No. 61/128,341, filed May 21, 2008, "Deployment of LTE UL System for Arbitrary System Bandwidths Via PUCCH Configuration", (21 pages).

* cited by examiner

= SUPPORTED ALLOCATION SCHEMES

| RB_start | [0 – 24][1] | [0] | [25 – 49] | [25 – 26] |
|---|---|---|---|---|---|
| Upper RBs limit | [24] | [30] | [50] | 20 | [25] |
| Lower RBs limit | 1 | [25] | [32] | 1 | [24] |
| A-MPR[2] [dB] | 0 | [6] | [12] | 0 | [8] |

1) ALL VALUES IN [ ] EXEMPLARY AND TO BE SET BY OPERATOR (OR BY 3GPP SPECS)
2) A-MPR: ADDITIONAL MAXIMUM POWER REDUCTION VALUES IN [ ] ESTIMATED HERE BASED ON R4-082971

▚ = SUPPORTED ALLOCATION SCHEMES

| RB_start | [0 – 24]¹ | [0] | | [25 – 49] | [25 – 26] |
|---|---|---|---|---|---|
| Upper RBs limit | [24] | [30] | [50] | [20] | [25] |
| Lower RBs limit | 1 | [25] | [32] | 1 | [24] |
| A-MPR² [dB] | 0 | [6] | [12] | 0 | [8] |

1) ALL VALUES IN [ ] EXEMPLARY AND TO BE SET BY OPERATOR (OR BY 3GPP SPECS)
2) A-MPR: ADDITIONAL MAXIMUM POWER REDUCTION VALUES IN [ ] ESTIMATED HERE BASED ON R4-082971

FIG. 9

| 10 MHz in lower Blocks B and C | | | | ...... towards MediaFlo |
|---|---|---|---|---|
| RB_start [RB#] | [0 - 5][1] | [6 – 30] | [31 – 36] | [37 – 49] |
| Allocation length [RBs] | [< 3] | [> 16] | [> 6] | [< 51] |
| A-MPR [dB] | [3] | [6] | [12] | [12] |

| 0 dB A-MPR UL Scheduler | Outer PUSCH | Used PUCCH | Center PUSCH | | Used PUCCH | Outer PUSCH |
|---|---|---|---|---|---|---|
| RB_start [RB #] | 0 - [12][1] | Used PUCCH [13, 14] | [15] - 30 | 31 – [34] | Used PUCCH [35, 36] | [37] - 49 |
| Upper allocation limit | 12 | 1 | 16 | 6 | 1 | 0 |
| Lower allocation limit | 3 | 1 | 1 | 1 | 1 | 1 |

1) ALL VALUES IN [ ] EXEMPLARY AND TO BE SET BY OPERATOR (OR BY 3GPP SPECS)

FIG. 10

CONTROLLING UE EMISSIONS FOR AVOIDING SELF-INTERFERENCE AND FOR DEMANDING COEXISTENCE SITUATIONS

FIELD OF THE INVENTION

The present invention relates to an apparatus, a method, and a computer program product for controlling user equipment emissions.

BACKGROUND OF THE INVENTION

The 3GPP standard Long-Term-Evolution (LTE) of UTRAN is a system using orthogonal frequency division multiplex (OFDM) standards with frequency-localized allocations.

In the LTE system one main difference to earlier 3GPP releases is the use of wide channels that are shared with users in frequency domain (i.e., frequency division multiplexing). Allocation for one user can vary from one resource block (RB) to maximum number of resource blocks in the channel (e.g. 50RB for 10 MHz channel). A resource block is the smallest allocable frequency range of the uplink or downlink frequency band lasting a predefined time. E.g., in LTE, a resource block is 180 kHz wide and lasts for a 0.5 ms time slot.

In such a system an effect called UE self-interference may occur, according to which emissions of the uplink (from the user equipment (UE) to the base station) extend into the downlink (from the base station to the user equipment). UE self-interference may exist both for intra-technology (e.g. LTE transmission to LTE reception) as well as for inter-technology cases. Interference may also occur where the LTE UE transmitter interferes with UE's receiver in the adjacent channel. This again may exist for intra-technology (LTE-TDD next to LTE-FDD) or inter-technology.

Conventional techniques for avoiding both UE-to-UE interference and UE self-interference are Uncritical frequency band organization (e.g. large duplex gaps);
Large guard bands; and
High quality (duplex) filters.

The two straightforward ways to solve the UE self-interference issues if conventional techniques are excluded consist in:

Limiting the UE power; or
Just accepting the lower sensitivity.

The latter alternative means that the evolved NodeB (eNodeB) must increase the downlink power to compensate for the reduced sensitivity. The current sensitivity specification allows for some sensitivity degradation for wide allocations (3GPP TS36.101 sub-clause 7.3).

SUMMARY OF THE INVENTION

It is an object of the present invention to improve the prior art.

According to a first aspect of the invention, there is provided an apparatus, comprising scheduling means configured to allocate one or more resource blocks to a channel in an uplink frequency band and/or a downlink frequency band according to a first telecommunication standard and the available frequency band for the uplink or downlink, respectively, wherein the scheduling means is additionally configured to take into account a limit of resource blocks to be allocated to the channel, and wherein the limit is at least one of an allowed resource block, a resource block to be avoided, a width of a range of allowed resource blocks, a non-usage information of the channel, an upper allowed resource block, and a lower allowed resource block, an upper limit of the number of resource blocks, a lower limit of the number of resource blocks, and any reasonable combinations of the limits mentioned.

Modifications of the first aspect may be as follows:

The apparatus may further comprise a calculating means configured to calculate the limit based on at least one of a position of the uplink frequency band; a position of a downlink frequency band; a width of the uplink frequency band; a width of the downlink frequency band; a bandwidth of the uplink channel; a width of a duplex gap between the uplink frequency band and the downlink frequency band; and a gap between the uplink channel and a frequency band of a second telecommunication standard other than the first telecommunication standard.

In the apparatus, the limit may be set such that at least one of a user equipment self-interference within the first telecommunication standard, a user equipment-to-user equipment interference, and a user equipment self-interference between the first and the second telecommunication standard is reduced compared to an apparatus without the uplink limit.

The apparatus may further comprise an interference detection means configured to detect at least one of a user equipment self-interference within the first telecommunication standard, a user equipment-to-user equipment interference, and a user equipment self-interference between the first and the second telecommunication standard, and wherein the scheduling means may be further configured to take the limit into account only, if the interference detection means detects that at least one of the user equipment self-interference within the first telecommunication standard, the user equipment-to-user equipment interference, and the user equipment self-interference between the first and the second telecommunication standard exceeds a respective predefined threshold.

In the apparatus, the first telecommunication standard may be a long term evolution standard.

In the apparatus, the limit of the downlink channel may be such that the resource allocation to the downlink channel does not comprise a resource block at a second frequency distance from a center of the uplink channel, wherein the second frequency distance is an integer multiple of a first frequency distance between the center of the uplink channel and an allocated resource block in the uplink frequency band.

In the apparatus, the scheduling means may be additionally configured to instruct, based on the non-usage information, a user equipment using the uplink not to use a physical uplink control channel, and to schedule aperiodic channel quality indicator reports to be transmitted on a physical uplink shared channel.

In the apparatus, the limit of the downlink channel may be such that a center of the downlink channel is farthest away from the uplink frequency band.

In the apparatus, the channel may be a physical uplink shared channel, and additionally a physical uplink control channel may be not located at an edge of the uplink frequency band.

In the apparatus, the scheduling means may be additionally configured to take the limit into account for a user equipment using the channel if a first predefined condition is fulfilled, and/or for the channel if a second predefined condition is fulfilled, and/or for at least one of the uplink or the downlink if a third predefined condition is fulfilled, and/or wherein the scheduling means may be additionally configured to take the limit of resource blocks into account only as far as it is not in conflict with other constraints for the allocation of the resource block to the channel.

The apparatus may further comprise a base station means configured to provide a base station functionality according to the first telecommunication standard.

The apparatus may be an apparatus for controlling user equipment emissions.

According to a second aspect of the invention, there is provided a method, comprising allocating a resource block to a channel in an uplink frequency band and/or a downlink frequency band according to a first telecommunication standard and the available frequency band for the uplink or downlink, respectively, wherein a limit of resource blocks to be allocated to the channel is additionally taken into account, and wherein the limit is at least one of an allowed resource block, a resource block to be avoided, a width of a range of allowed resource blocks, a non-usage information of the channel, an upper allowed resource block, a lower allowed resource block, an upper limit of the number of resource blocks, a lower limit of the number of resource blocks, and any reasonable combinations of the limits mentioned.

Modifications of the second aspect may be as follows:

The method may further comprise calculating the limit based on at least one of a position of the uplink frequency band; a position of a downlink frequency band; a width of the uplink frequency band; a width of the downlink frequency band; a bandwidth of the uplink channel; a width of a duplex gap between the uplink frequency band and the downlink frequency band; and a gap between the uplink channel and a frequency band of a second telecommunication standard other than the first telecommunication standard.

The method may further comprise setting the limit such that at least one of a user equipment self-interference within the first telecommunication standard, a user equipment-to-user equipment interference, and a user equipment self-interference between the first and the second telecommunication standard is reduced compared to the method without the limit.

The method may further comprise detecting at least one of a user equipment self-interference within the first telecommunication standard, a user equipment-to-user equipment interference, and a user equipment self-interference between the first and the second telecommunication standard, and the allocating may take the limit into account only, if at least one of the user equipment self-interference within the first telecommunication standard, the user equipment-to-user equipment interference, and the user equipment self-interference between the first and the second telecommunication standard exceeds a respective predefined threshold.

In the method, the first telecommunication standard may be a long term evolution standard.

The method may further comprise setting the limit of the downlink channel such that the resource allocation to the downlink channel does not comprise a resource block at a second frequency distance from a center of the uplink channel, wherein the second frequency distance is an integer multiple of a first frequency distance between the center of the uplink channel and an allocated resource block in the uplink frequency band.

The method may further comprise instructing, based on the non-usage information, a user equipment using the uplink not to use a physical uplink control channel, and to schedule aperiodic channel quality indicator reports to be transmitted on a physical uplink shared channel.

The method may further comprise setting the limit of the downlink channel such that a center of the downlink channel is farthest away from the uplink frequency band In the method, the channel may be a physical uplink shared channel, and wherein additionally a physical uplink control channel may be not located at an edge of the uplink frequency band.

In the method the limit may be taken into account for a user equipment using the channel if a first predefined condition is fulfilled, and/or for the channel if a second predefined condition is fulfilled, and/or for at least one of the uplink or the downlink if a third predefined condition is fulfilled, and/or only as far as it is not in conflict with other constraints for the allocation of the resource block to the channel.

The method may be performed by a scheduler.

The method may be a method for controlling user equipment emissions.

According to a third aspect of the invention, there is provide a computer program product embodied on a computer-readable medium, comprising program instructions which perform, when run on a computer, the execution of which result in operations of the method according to the second aspect.

Modifications of the third aspect may be corresponding to the modifications of the second aspect.

According to a further modification of the third aspect, the computer program product may be embodied as a computer-readable storage medium.

According to a fourth aspect of the invention, there is provided an apparatus, comprising a scheduler configured to allocate one or more resource blocks to a channel in an uplink frequency band and/or a downlink frequency band according to a first telecommunication standard and the available frequency band for the uplink or downlink, respectively, wherein the scheduler is additionally configured to take into account a limit of resource blocks to be allocated to the channel, and wherein the limit is at least one of an allowed resource block, a resource block to be avoided, a width of a range of allowed resource blocks, a non-usage information of the channel, an upper allowed resource block, and a lower allowed resource block, an upper limit of the number of resource blocks, a lower limit of the number of resource blocks, and any reasonable combinations of the limits mentioned.

Modifications of the fourth aspect may be as follows:

The apparatus may further comprise a calculator configured to calculate the limit based on at least one of a position of the uplink frequency band; a position of a downlink frequency band; a width of the uplink frequency band; a width of the downlink frequency band; a bandwidth of the uplink channel; a width of a duplex gap between the uplink frequency band and the downlink frequency band; and a gap between the uplink channel and a frequency band of a second telecommunication standard other than the first telecommunication standard.

In the apparatus, the limit may be set such that at least one of a user equipment self-interference within the first telecommunication standard, a user equipment-to-user equipment interference, and a user equipment self-interference between the first and the second telecommunication standard is reduced compared to an apparatus without the uplink limit.

The apparatus may further comprise an interference detector configured to detect at least one of a user equipment self-interference within the first telecommunication standard, a user equipment-to-user equipment interference, and a user equipment self-interference between the first and the second telecommunication standard, and wherein the scheduler may be further configured to take the limit into account only, if the interference detector detects that at least one of the user equipment self-interference within the first telecommunication standard, the user equipment-to-user equipment interference, and the user equipment self-interference between the first and the second telecommunication standard exceeds a respective predefined threshold.

In the apparatus, the first telecommunication standard may be a long term evolution standard.

In the apparatus, the limit of the downlink channel may be such that the resource allocation to the downlink channel does not comprise a resource block at a second frequency distance from a center of the uplink channel, wherein the second frequency distance is an integer multiple of a first frequency distance between the center of the uplink channel and an allocated resource block in the uplink frequency band.

In the apparatus, the scheduler may be additionally configured to instruct, based on the non-usage information, a user equipment using the uplink not to use a physical uplink control channel, and to schedule aperiodic channel quality indicator reports to be transmitted on a physical uplink shared channel.

In the apparatus, the limit of the downlink channel may be such that a center of the downlink channel is farthest away from the uplink frequency band.

In the apparatus, the channel may be a physical uplink shared channel, and additionally a physical uplink control channel may be not located at an edge of the uplink frequency band.

In the apparatus, the scheduler may be additionally configured to take the limit into account for a user equipment using the channel if a first predefined condition is fulfilled, and/or for the channel if a second predefined condition is fulfilled, and/or for at least one of the uplink or the downlink if a third predefined condition is fulfilled, and/or wherein the scheduler may be additionally configured to take the limit of resource blocks into account only as far as it is not in conflict with other constraints for the allocation of the resource block to the channel.

The apparatus may further comprise a base station processor configured to provide a base station functionality according to the first telecommunication standard.

It is to be understood that any of the above modifications can be applied singly or in combination to the respective aspects to which they refer, unless they are explicitly stated as excluding alternatives.

Further details, features, objects, and advantages are apparent from the following detailed description of the preferred embodiments of the present invention which is to be taken in conjunction with the appended drawings, in which FIG. 1 shows a UE emission spectrum with 1 RB allocation at the upper edge of 15 MHz channel;

FIG. 9 shows an UL allocation table for band 12 of a 0 dB A-MPR UL scheduler;

FIG. 10 shows an example allocation table for LTE to MediaFlo emission control;

Figure 11A:
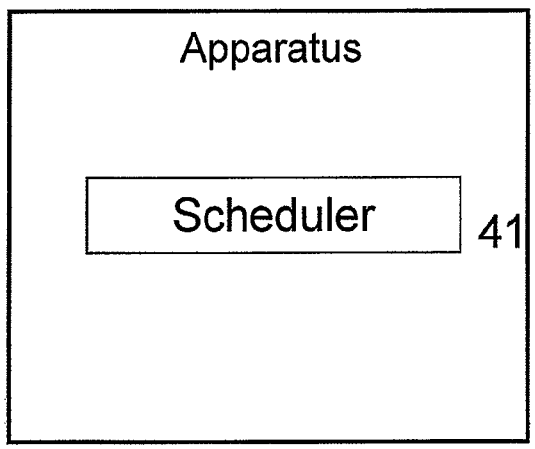
Figure 11B:
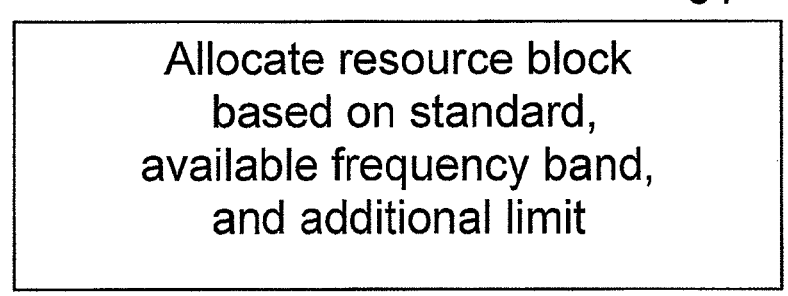

FIG. 11a) shows a principle configuration of an apparatus according to certain embodiments of the present invention; and FIG. 11b) shows a principle flowchart of a method according to certain embodiments of the present invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

In an LTE system, two kinds of self interference may occur:

A) The first of them relates to a relatively small duplex distance between Uplink and Downlink frequency bands in LTE frequency division duplex (FDD). In the UE, a large allocation in uplink may cause spectrum spreading that can extend all the way to the downlink band. The noise from transmitter (TX) can degrade UE receiver (RX) sensitivity over 10 dB in these cases. Also very narrow allocations at the edge of the channel can cause problems because the spurious emission energy concentrates in narrow bandwidth. This effect is called UE self-interference. UE self-interference may exist both for intra-technology (e.g. LTE transmission to LTE reception) as well as for inter-technology cases.

B) The second of them relates to tight coexistence cases where the LTE UE transmitter interferes with UE's receiver in the adjacent channel. This again may exist for intra-technology (LTE-TDD next to LTE-FDD) or inter-technology.

UE self-desensitization to mitigate self-interference has been studied in 3GPP (c.f. R4-080708, R4-080312, R4-080352, and R4-082971). In R4-080708 a model for UE self-desensitization was proposed in order to quantify the impact of self-interference accurately, and a de-sense noise model based on RF hardware measurements analysis has been proposed.

Figure 7:
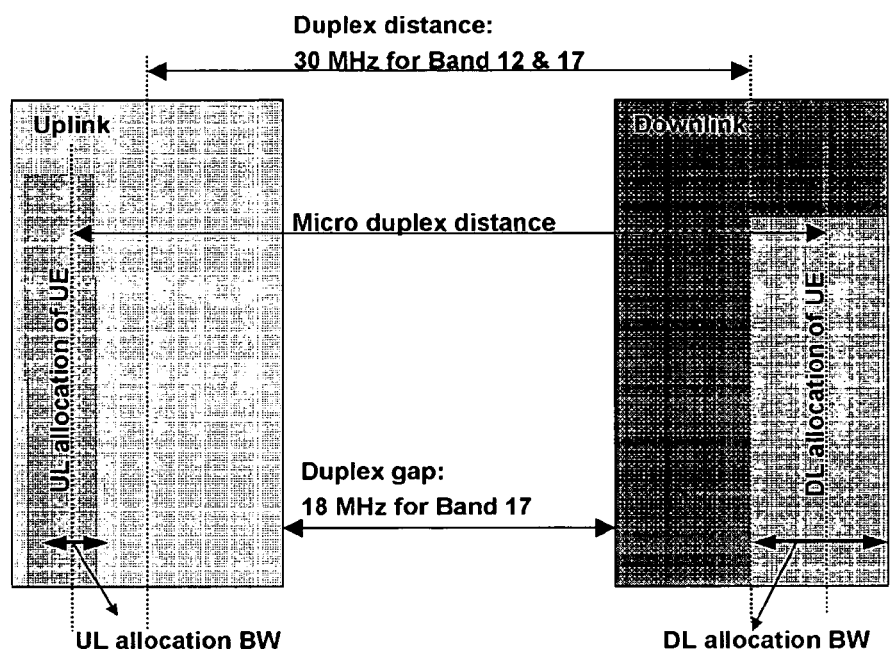
FIG. 7 shows a de-sense model with the parameters influencing UE self-interference.

FIG. 7 illustrates a similar de-sense model with the parameters influencing UE self-interference. Accordingly, UE self-interference depends on the duplex distance defined by the frequency band;

micro duplex distance defined by the concurrently used DL and UL sub-spectrum;

aggressor bandwidth (UL allocation) and the victim bandwidth (DL allocation); and transmit power on the UL allocation.

Qualitatively, this means that the larger the frequency band duplex gap the less significant is UE self-interference;

UE self-interference can be reduced by maximizing the micro duplex distance;

UE self-interference can be reduced by limiting a UE's UL allocation in bandwidth and/or in transmit power without interacting with downlink; and UE self-interference can be reduced by limiting a UE's UL allocation in bandwidth and/or transmit power depending on the micro duplex distance and allocation bandwidth of its downlink.

The last aspect is addressed with Uplink/Downlink scheduler interaction as described as the first mechanism below.

Very recently, 3GPP RAN4 WG has approved that Band 17 UEs should be able to tolerate a −30 dBm blocker inside their duplex gap to protect the UE from MediaFlo.

As far as known, there has been no RAN4 WG discussion nor is there an entry into the TS 36.101 v8.4.0 specification for protecting MediaFlo from LTE. To our understanding, there could be an issue with LTE-to-MediaFlo UE self-interference as well as with LTE-to-MediaFlo UE-to-UE interference.

The UE Spectrum Emission Mask (SEM) allows for −26 dBm/100 kHz emissions into MediaFlo, and normal −36 dBm/100 KHz spurious emissions at a larger offset. Comparing these limits to the Public Safety emission limit of −48 dBm/100 KHz at a carrier edge offset (guard band) of 2 MHz (c.f. TS 36.101 v8.4.0, Table 6.6.3.3.2-1), there is a certain risk of UE self-interference or UE-to-UE interference when deploying 10 MHz LTE in Blocks B and C of Band 17 or Band 12.

In case of an LTE UE interfering with a MediaFlo device next to it (LTE-to-MediaFlo UE-to-UE interference) rather than interfering with its own MediaFlo receiver, the interference situation is relaxed due to an increased system coupling loss.

Because LTE UE emissions outside the carrier depend on the UE's allocation width and position within the carrier spectrum (both in uplink and in downlink), the eNodeB scheduler deciding on the allocation of resource blocks to the UE can control the UE emissions and hence control UE self-interference and UE-to-UE interference (i.e. between two different UEs).

According to some embodiments of the present invention a set of mechanisms to avoid or minimize the interference caused by simultaneous transmission and reception of uplink and downlink signals in an UE of an FDD system is provided.

The $2^{nd}$ mechanism proposed also provides a means to avoid or minimize the interference caused in tight intra- as well as inter-technology coexistence cases between two different UEs.

Both mechanisms are based on controlling the uplink scheduler, wherein the first mechanism additionally controls the downlink scheduler. The uplink/downlink scheduler of an eNodeB is responsible for allocating resource blocks to UEs, e.g. based on the LTE standard and the available uplink and downlink frequency band.

The mechanisms are:

(1) Downlink/Uplink scheduler interaction: This consists of prediction of the frequency location of the spurious emissions caused by the transmission of the uplink signals.

In order to avoid or minimize UE self-interference, the frequency domain properties of the predicted spurious emission in Uplink/Downlink resource allocation (scheduling) are taken into account. As UE spectrum emissions are caused mainly by intermodulation distortion, it is possible to predict where the spurious emissions will be located. In some cases, this prediction can be made by a simple calculation. The downlink allocation may be correspondingly adapted.

(2) Uplink scheduler (UL scheduler): The UL scheduler may counter-act UE-to-UE interference or UE self-interference based on multiple sets of upper and lower allocation limits up to PRB resolution and may also take into account reducing the maximum UE transmit power depending on the actual UL allocation width and position.

FIG. 11a) shows a principle configuration of an apparatus according to certain embodiments of the present invention. That is, as shown in FIG. 11a), an apparatus comprises scheduling means (41) configured to allocate one or more resource blocks to a channel in an uplink frequency band and/or a downlink frequency band according to a first telecommunication standard and the available frequency band for the uplink or downlink, respectively, wherein the scheduling means is additionally configured to take into account a limit of resource blocks to be allocated to the channel, and wherein the limit is at least one of an allowed resource block, a resource block to be avoided, a width of a range of allowed resource blocks, a non-usage information of the channel, an upper allowed resource block, and a lower allowed resource block, an upper limit of the number of resource blocks, a lower limit of the number of resource blocks, and any reasonable combinations of the limits mentioned.

FIG. 11b) shows a principle flowchart of a method according to certain embodiments of the present invention.

Specifically, as shown in FIG. 11b), the method comprises allocating (51) a resource block to a channel in an uplink frequency band and/or a downlink frequency band according to a first telecommunication standard and the available frequency band for the uplink or downlink, respectively, wherein a limit of resource blocks to be allocated to the channel is additionally taken into account, and wherein the limit is at least one of an allowed resource block, a resource block to be avoided, a width of a range of allowed resource blocks, a non-usage information of the channel, an upper allowed resource block, a lower allowed resource block, an upper limit of the number of resource blocks, a lower limit of the number of resource blocks, and any reasonable combinations of the limits mentioned.

The method may be performed by a scheduler as shown in FIG. 11a).

According to an embodiment of the present invention, an additional allocation table may be used that sets boundaries to the scheduling of resource blocks, wherein these boundaries are set such that UE self-interference and/or a UE-to-UE interference is avoided or at least reduced. If both uplink and downlink scheduler are involved, either the uplink or the downlink allocation may be given based on the LTE standard and the available resources for that link, and the allocation of the other link may be set according to the LTE standard, the available resources for the other link, additionally taking into account the additional allocation table.

According to one embodiment, interference caused by a narrowband uplink channel is avoided. A narrowband uplink channel is a channel to which not more than 20, preferably not more than 10 or 5, more preferably 1 resource blocks (RB) are allocated. Spurious components of these uplink channel emissions are located at integer multiples of the distance of the allocated uplink RB from the center of the uplink frequency band. To maximize the downlink (DL) sensitivity those frequency positions suffering from spurious emissions of a given uplink channel are excluded/avoided in the DL resource allocation.

The emissions may not only occur for narrowband uplink channels, but also for wideband channels. However, for wideband emissions, it would be usually hard to avoid the corresponding downlink frequencies. Instead, in these cases, the power of the uplink channel may be reduced.

One example of a narrowband uplink channel is the physical uplink control channel (PUCCH) of LTE, which may be located at the edge of the UL channel. In the case of PUCCH, the spurious components are located at integer multiples of the distance of the PUCCH from the center of the uplink frequency band. To maximize the downlink (DL) sensitivity those frequency positions suffering from spurious emissions of a given PUCCH are excluded/avoided in the DL resource allocation.

Figure 1:
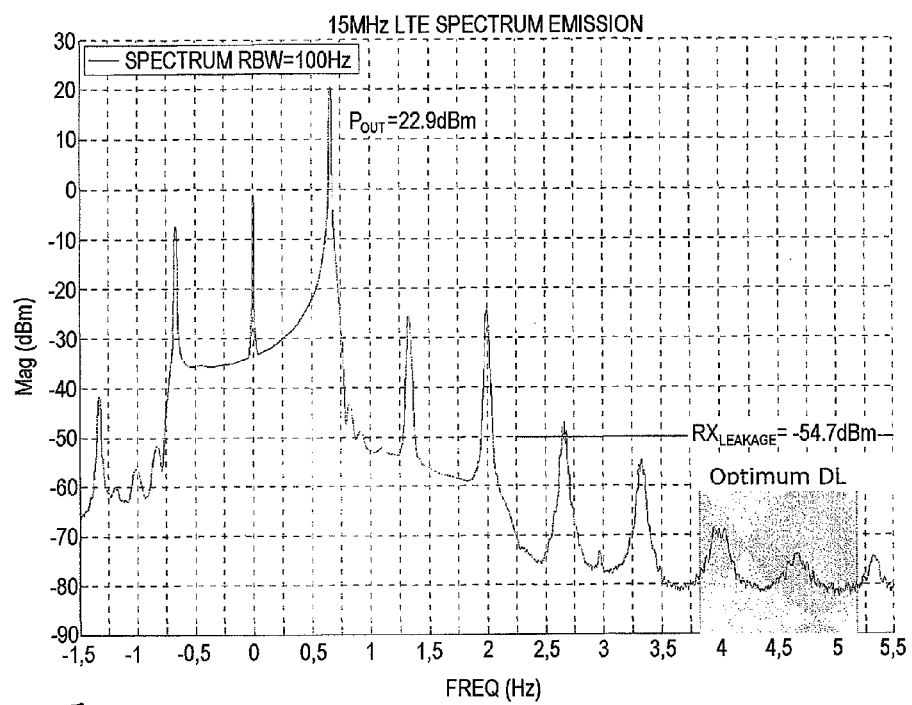

FIG. 1 shows a UE emission spectrum with 1 RB allocation at the upper edge of 15 MHz channel. This spectrum, and also the other spectra shown in FIGS. 2 to 6 are simulated using a MATLAB code. Similar pictures may be generated also using almost any commercially available circuit simulator. The main components that have been modelled are modulator and Power amplifier. Modulator model is linear including the main non-idealities LO leakage and image leakage. PA model is a nonlinear memoryless model and parameters for that are based on a PA measurement.

In FIG. 1, the spurious emissions are clearly recognizable as peaks in the spectrum. In the hashed area, the optimum DL allocation is shown, where the leakage of the UL emission ($RX_{Leakage}$) is below −54.7 dBm.

Alternatively, for a given DL resource allocation, the PUCCH may be set such that its spurious emissions are outside the DL resource allocation.

According to another embodiment, the scheduler may operate such that it allocates concurrent physical uplink shared channel (PUSCH) resources for the UE transmitting only control information (PUCCH resource becomes unused in these cases). This may be achieved e.g., in such that eNodeB schedules aperiodic channel quality indication reports to be transmitted as PUSCH data on the PUSCH together with UL control. A PUSCH resource to be used in this case is selected based on the UL-DL interference.

According to another embodiment, a DL allocation may be as far as possible from a given wideband UL allocation, wherein a wideband allocation means an contiguous allocation of several (e.g. 20 or more, 40 or more, or 60 or more) resource blocks.

Figure 2:
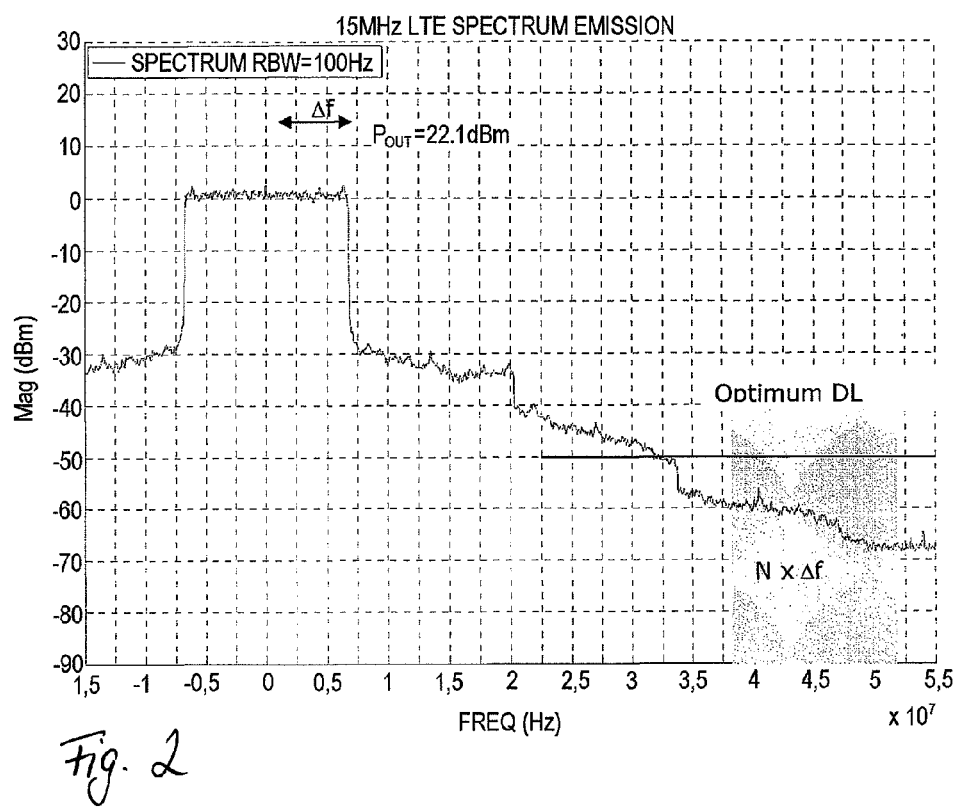
FIG. 2 shows a UE emission spectrum with 75 RB allocation at the 15 MHz channel.

FIG. 2 shows a UE emission spectrum with 75 RB allocation at the 15 MHz channel. The emissions outside the channel decrease with the distance from the channel. In the hashed area, the optimum DL allocation is shown, where the leakage of the UL emission ($RX_{Leakage}$) is below −40.4 dBm.

According to another embodiment, a wideband UL allocation may be as far as possible from a given downlink allocation.

According to another embodiment, for narrowband PUSCH allocations predicted interference is taken into account both in UL and in DL scheduling. The benefit of this arrangement is that scheduler restrictions are getting smaller as there are more options for interference avoidance.

In addition of the frequency position of the UL/DL resource allocation one may adjust the power spectral density of the PUSCH such that UL-DL interference is minimized. The same applies to the bandwidth allocation for the PUSCH, i.e., the scheduler may change the bandwidth allocation of the PUSCH such that UL→DL interference problem is minimized.

According to yet another embodiment the time domain may be capitalized when scheduling UL/DL resources for a given UE.

It is possible to prioritize different sub-frames for DL traffic and UL traffic (data/control). This may be particular advantageous for those UEs having problems with UL/DL interference. Those UEs are most probably located at the cell edge and are transmitting with high transmit power and narrow transmit bandwidth in uplink.

An embodiment using the $2^{nd}$ mechanism, i.e. based on the uplink scheduler only, is described hereinafter. In this embodiment, the behaviour of an LTE UE transmitting e.g. in the lower 700 MHz frequency band which has a very small duplex gap is shown.

Figure 3:
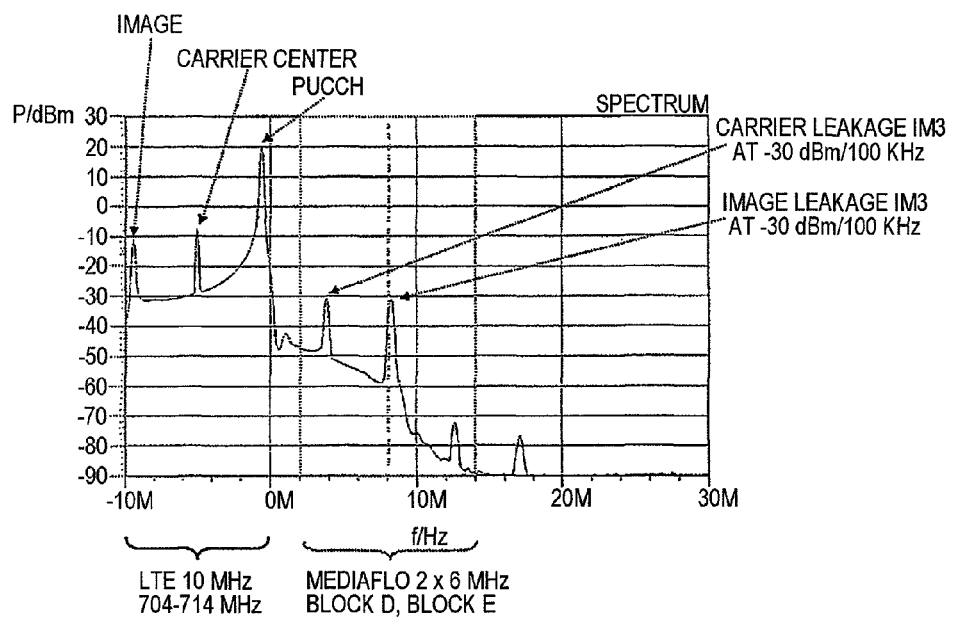
FIG. 3 shows emission of an LTE UE in the lower 700 MHz band caused by the PUCCH at the edge of the uplink band.

FIG. 3 shows emission of an LTE UE in the lower 700 MHz band caused by the PUCCH. FIG. 3 illustrates that PUCCH transmission causes significant $3^{rd}$ order transmit intermodulation products together with the local oscillator (LO) leakage in the carrier center as well as with the PUCCH image at the counter edge of the carrier spectrum. The power of the $3^{rd}$ order intermodulation products shows a cubic dependency on the power of the original signal. These spurs are quite difficult to suppress and contribute both to UE self-interference as well as to UE-to-UE interference.

Figure 4:
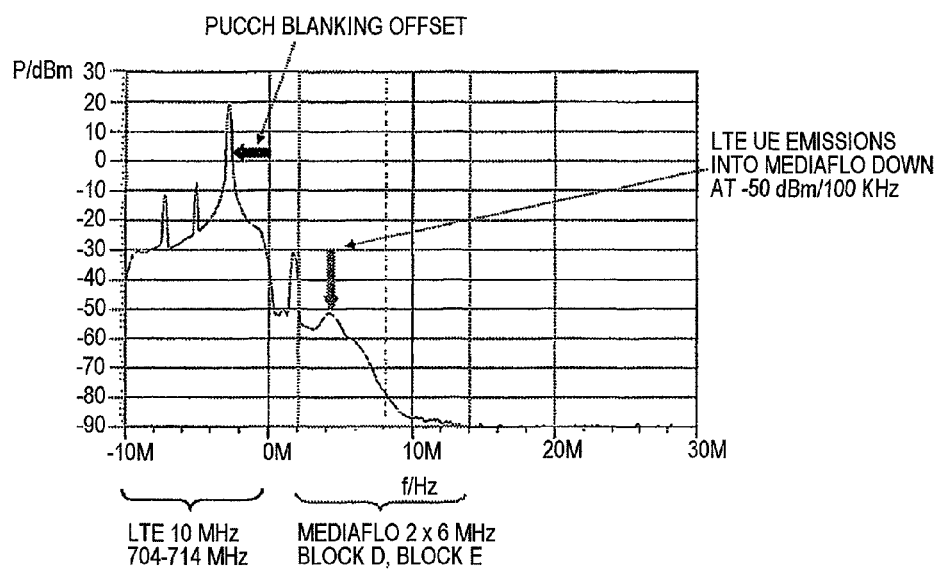
FIG. 4 shows emission of an LTE UE in the lower 700 MHz band caused by the PUCCH shifted towards the center of the uplink band by 12 RB.

FIG. 4 is identical with FIG. 3 except that the used PUCCH is allocated by 12 RBs closer to the carrier center frequency. This shifted allocation is called PUCCH Blanking (c.f. U.S. 61/128,341, May 21, 2008). The PUCCH $3^{rd}$ order intermodulation products move closer to the carrier spectrum. Hence, the larger the offset of the used PUCCH from the carrier edge, the smaller could be the guard band to a neighbour like MediaFlo.

Figure 5:
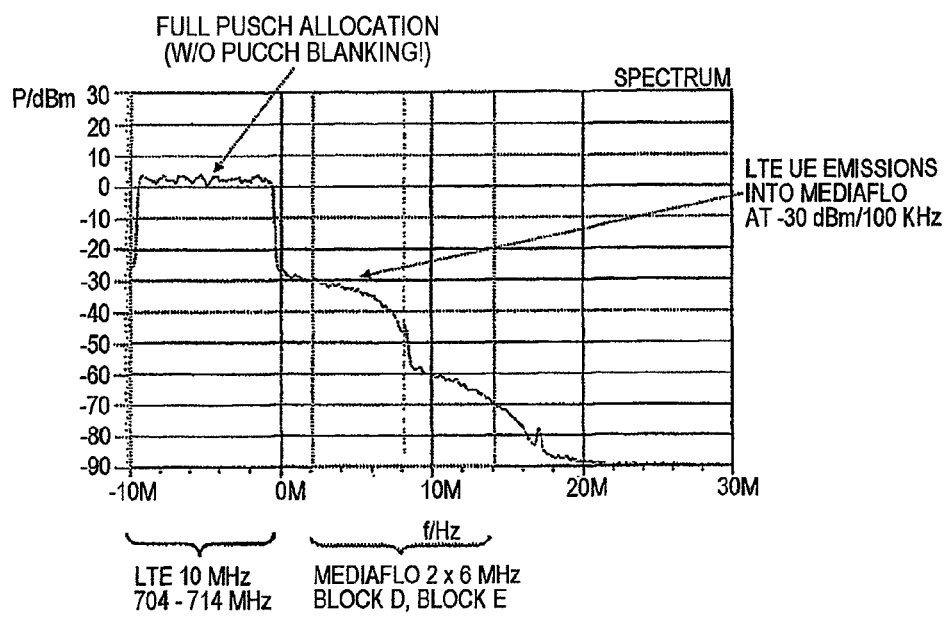
FIG. 5 shows the UE emissions in case of full-band PUSCH transmission.

FIG. 5 shows the UE emissions in case that the maximum available frequency band is used for PUSCH transmission (full-band PUSCH transmission). One may understand this as a combination of noise leakage plus an aggregation of all kinds of $3^{rd}$ order and higher order intermodulation products. Depending on the implementation of the power amplifier the power levels of wider allocations may show cubic up to only linear dependency on the UE transmission power. The emissions into the neighbouring MediaFlo band are clearly visible.

Figure 6:
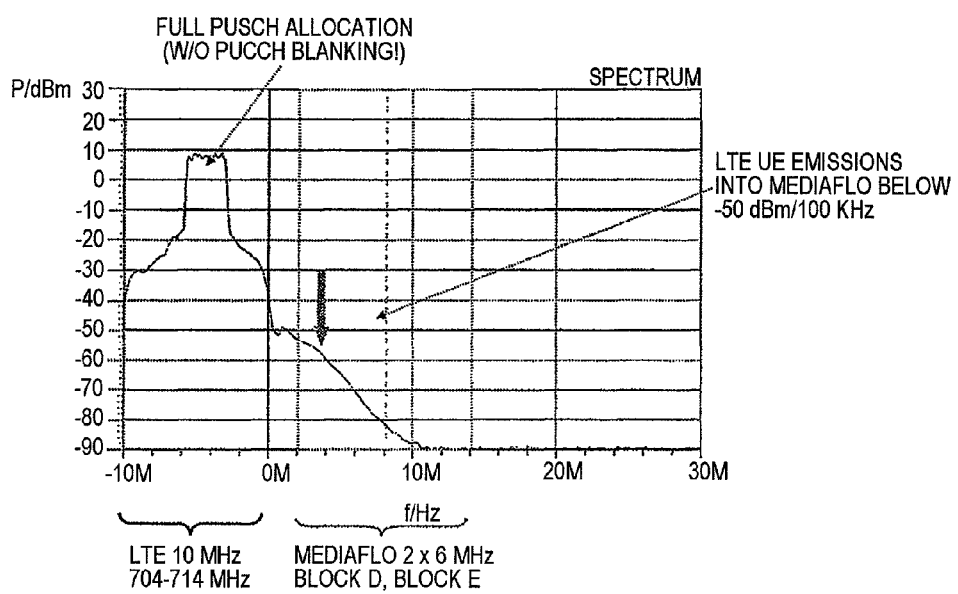
FIG. 6 shows the UE emissions in case of PUSCH transmission limited to less than 16 resource blocks.

FIG. 6 shows how UE emissions are reduced compared with those of FIG. 5 when applying a maximum PUSCH allocation limit in the UL scheduler (in this example: less than 16 RBs). In particular, the emissions into the neighboring Mediaflo band are strongly reduced.

From FIGS. 3 to 6, it can be understood that a combination of firstly avoiding narrow allocations for limiting the frequency reach of their $3^{rd}$ order intermodulation products into the RX band and secondly limiting allocation bandwidth in the UL scheduler keeps the power level of emissions low. I.e., a combination of PUCCH blanking and UL scheduler solutions reduces efficiently unwanted UE emissions.

For UL scheduler-based self-interference mitigation, UE capabilities with respect to self-interference control are standardized (however, not on a very fine-grain level).

Here, we propose in addition to the standardized self-interference mitigation an UL scheduler that allows for "blindly" (i.e. without detailed specification in 3GPP) counter-acting UE self-interference by introducing an UL allocation table. Such an additional allocation table is very favourable for the lower 700 MHz bands because of their neighborhood to Block D and E of MediaFlo.

Figure 8:
FIG. 8 shows an UL allocation table for band 12.

FIG. 8 shows an UL allocation table for band 12 targeting at avoiding UE self-interference through UL scheduling with upper allocation limits. Units of the values in the first three rows are RBs. The first row indicates the start location so that 0 is the lower frequency end of the channel and 49 the higher. The upper and lower limits in the $2^{nd}$ and $3^{rd}$ rows mean the length of the contiguous RB allocation. The last row is Additional Maximum Power Reduction (A-MPR) in dB.

The first column of FIG. 8 means that the contiguous RB allocation that starts between 0th and 24th RB and has length between 1 and 24 RBs has A-MPR of 0 dB. So no power reduction (A-MPR) is allowed. The next column means that a RB allocation that starts at RB number 0 and has length between 25 and 30 RBs can have A-MPR of 6 dB. According to the third column even more power reduction (A-MPR) is allowed because longer contiguous allocation creates more emissions.

In the last two columns some A-MPR for smaller allocations in the upper edge of the channel are shown. These A-MPR values are higher than the corresponding ones in the lower part of the channel because the higher start point means that you are closer to the MediaFlo band.

Some values in the table are in brackets as they may be chosen by the operator and/or in line with the devices supported in Band 12. They have been estimated from the maximum sensitivity degradation values presented in R4-082971 and are rather meant to illustrate the approach than any vendor's UE capabilities. Furthermore, the allocation table approach would take advantage if it was standardized in 3GPP.

A similar table as shown in FIG. 8 could be created for Band 17. It can be assumed, however, that UE self-interference is a little less critical in Band 17 than in Band 12 as the MediaFlo blocking requirement, recently added to the TS 36.101 v8.4.0 specification, implies a sharp UE duplex filter which will eliminate part of the UE self-interference power from the receiver.

An allocation table as given in FIG. 8 can serve as basis for different UL scheduler variants depending on the additional maximum power reduction (A-MPR):

A-MPR=0 dB UL scheduling: This means that parts of the allocation table are not used if these require a reduction of the maximum UE transmit power. The 0 dB A-MPR UL scheduler is illustrated by the darkened area in FIG. 9, wherein the columns and rows have the same meaning as in FIG. 8. The UL scheduler applies on PRBs: #0 up to #24 an upper allocation limit of 24 PRBs and on PRBs: #25 up to #49 an upper allocation limit of 20 PRBs.

A-MPR>0 dB UL scheduling: This means that the complete table is supported by the UL scheduler interacting with UL power control.

Interference to a MediaFlo device can be significantly reduced when applying some of the mechanisms described above, such as PUCCH Blanking and 0 dB A-MPR UL scheduling with multiple sets of upper and lower allocation limits. An example allocation table for LTE to MediaFlo emission control is shown in FIG. 10.

In some embodiments, the allocation table may be applied when a UE self-interference or a UE-to-UE interference is detected.

In other embodiments, the allocation table may be applied regardless from any detection of interference.

In some embodiments, a restriction to the allocation of RBs to a channel may be applied only if it is not in conflict with other constraints regarding the allocation of RBs to channels, while in other embodiments, it may be applied regardless of other constraints.

In some embodiments, a restriction to the allocation of RBs to channels may be applied only to UEs fulfilling a predetermined condition such as power-limited/cell edge UEs, channels fulfilling a predetermined condition such as physical uplink control channel instead of physical uplink shared data channel, or predetermined link directions, e.g. UL instead of both UL/DL. In other embodiments, the restriction may be applied to all UEs, channels, or link directions.

The mechanisms described with respect to the embodiments herein may not only be applied to an LTE system, but also to other systems based on OFDM standards with frequency-localized allocations. E.g., some of the mechanisms may also be implemented in WiMAX if FDD profiles will be taken into use there.

In some embodiments of a scheduler, the limits of the allocation table may be calculated based on predefined rules taking into account e.g. a position of the uplink frequency band; a position of a downlink frequency band; a width of the uplink frequency band; a width of the downlink frequency band; a bandwidth of the uplink channel; a width of a duplex gap between the uplink frequency band and the downlink frequency band; and a gap between the uplink channel and a frequency band of a second telecommunication standard other than the first telecommunication standard.

In other embodiments of a scheduler, the allocation table may be predefined or partly predefined and partly calculated.

According to the above description, it should thus be apparent that exemplary embodiments of the present invention provide, for example from the perspective of a an uplink or downlink scheduler of an evolved Node B, or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods and computer program products capable of avoiding or reducing self-interference. In particular, it is provided an apparatus, comprising scheduling means configured to allocate one or more resource blocks to a channel in an uplink frequency band and/or a downlink frequency band according to a first telecommunication standard and the available frequency band for the uplink or downlink, respectively, wherein the scheduling means is additionally configured to take into account a limit of resource blocks to be allocated to the channel, and wherein the limit is at least one of an allowed resource block, a resource block to be avoided, a width of a range of allowed resource blocks, a non-usage information of the channel, an upper allowed resource block, and a lower allowed resource block, an upper limit of the number of resource blocks, a lower limit of the number of resource blocks, and any reasonable combinations of the limits mentioned.

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
 at least one processor; and
 at least one memory including computer code;
 the at least one memory and computer code configured, with the at least one processor, to cause the apparatus to perform at least the following:
  scheduling in a wireless network at least in an uplink frequency band, a downlink frequency band, or in both the uplink and the downlink frequency bands, according to a first telecommunication standard, comprising allocating one or more resource blocks to at least an uplink channel, a downlink channel, or both the uplink and the downlink channels, respectively, wherein the scheduling takes into account a limit of resource blocks to be allocated to the uplink or the downlink channel, wherein the limit is at least one of an upper allowed resource block,
a lower allowed resource block, and
a lower number limit of resource blocks, and wherein the scheduling in the uplink frequency band takes into account reducing maximum user equipment transmit power depending on a limit of resource blocks to be allocated to the uplink channel, and wherein the limit of resource blocks to be allocated to the downlink channel is such that the resource allocation to the downlink channel does not comprise a resource block at a second frequency distance from a center of the uplink channel, wherein the second frequency distance is an integer multiple of a first frequency distance between the center of the uplink channel and an allocated resource block in the uplink frequency band; and communicating using the scheduled one or more resource blocks.

2. The apparatus according to claim 1, wherein the at least one memory and computer code are further configured, with the at least one processor, to additionally cause the apparatus to perform at least the following:

calculating the limit based on at least one of the following:
a position of the uplink frequency band;
a position of a downlink frequency band;
a width of the uplink frequency band;
a width of the downlink frequency band;
a bandwidth of the uplink channel;
a width of a duplex gap between the uplink frequency band and the downlink frequency band; and
a gap between the uplink channel and a frequency band of a second telecommunication standard other than the first telecommunication standard.

3. The apparatus according to claim 1, wherein the limit of resource blocks to be allocated to the uplink channel is set such that at least one of the following is reduced compared to an apparatus without the limit:

a user equipment self-interference within the first telecommunication standard,
a user equipment-to-user equipment interference, and
a user equipment self-interference between the first and the second telecommunication standard.

4. The apparatus according to claim 3, wherein the at least one memory and computer code are further configured, with the at least one processor, to additionally cause the apparatus to perform at least the following:

interference detection by detecting at least one of the following:
a user equipment self-interference within the first telecommunication standard,
a user equipment-to-user equipment interference, and
a user equipment self-interference between the first and the second telecommunication standard, wherein the scheduling further comprises taking the limit into account only if the interference detection detects that at least one of the following exceeds a respective predefined threshold:

the user equipment self-interference within the first telecommunication standard,
the user equipment-to-user equipment interference, and
the user equipment self-interference between the first and the second telecommunication standard.

5. The apparatus according to claim 1, wherein the first telecommunication standard is a long term evolution standard.

6. The apparatus according to claim 5, wherein the limit of resource blocks to be allocated to the downlink channel is such that a center of the downlink channel is farthest away from the uplink frequency band.

7. The apparatus according to claim 6, wherein the channel is a physical uplink shared channel, and wherein additionally a physical uplink control channel is not located at an edge of the uplink frequency band.

8. The apparatus according to claim 1, wherein the scheduling additionally comprises instructing, based on the non-usage information, the user equipment using the uplink not to use a physical uplink control channel, and scheduling aperiodic channel quality indicator reports to be transmitted on a physical uplink shared channel.

9. The apparatus according to claim 1, wherein the scheduling additionally comprises taking the limit into account with at least one of the following:

for a user equipment using the channel if a first predefined condition is fulfilled;
for the channel if a second predefined condition is fulfilled; and
for at least one of the uplink or the downlink if a third predefined condition is fulfilled;

wherein the scheduling additionally comprises taking the limit of resource blocks into account only as far as it is not in conflict with other constraints for the allocation of the resource block to the channel.

10. An apparatus according to claim 1, wherein the at least one memory and computer code are further configured, with the at least one processor, to cause the apparatus to perform at least the following:

providing base station functionality according to the first telecommunication standard.

11. A method, comprising:

scheduling in a wireless network in an uplink frequency band, a downlink frequency band, or both the uplink and the downlink frequency bands according to a first telecommunications standard, comprising allocating one or more resource blocks to an uplink channel, a downlink channel, or both the uplink and the downlink channels, respectively, wherein the allocating takes into account a limit of resource blocks to be allocated to the uplink or downlink channel; and wherein the limit is at least one of
an upper allowed resource block,
a lower allowed resource block, and
a lower limit of the number of resource blocks; and wherein the scheduling in the uplink frequency band takes into account reducing the maximum user equipment transmit power depending on the limit of resource blocks to be allocated to the uplink channel, and wherein the limit of resource blocks to be allocated to the downlink channel is such that the resource allocation to the downlink channel does not comprise a resource block at a second frequency distance from a center of the uplink channel, wherein the second frequency distance is an integer multiple of a first frequency distance between the center of the uplink channel and an allocated resource block in the uplink frequency band; and communicating using the scheduled one or more resource blocks.

12. The method according to claim 11, further comprising calculating the limit based on at least one of the following:
- a position of the uplink frequency band;
- a position of a downlink frequency band;
- a width of the uplink frequency band;
- a width of the downlink frequency band;
- a bandwidth of the uplink channel;
- a width of a duplex gap between the uplink frequency band and the downlink frequency band; and
- a gap between the uplink channel and a frequency band of a second telecommunication standard other than the first telecommunication standard.

13. The method according to claim 11, further comprising setting the limit of resource blocks to be allocated to the uplink channel such that at least one of the following is reduced compared to the method without the limit:
- a user equipment self-interference within the first telecommunication standard;
- a user equipment-to-user equipment interference; and
- a user equipment self-interference between the first and the second telecommunication standard.

14. The method according to claim 13, further comprising detecting at least one of the following:
- a user equipment self-interference within the first telecommunication standard;
- a user equipment-to-user equipment interference; and
- a user equipment self-interference between the first and the second telecommunication standard;
- wherein the allocating takes the limit into account only if at least one of the following exceeds a respective predefined threshold:
  - the user equipment self-interference within the first telecommunication standard;
  - the user equipment-to-user equipment interference; and
  - the user equipment self-interference between the first and the second telecommunication standard.

15. The method according to claim 11, wherein the first telecommunication standard is a long term evolution standard.

16. The method according to claim 15, further comprising instructing a user equipment using the uplink not to use a physical uplink control channel, and scheduling aperiodic channel quality indicator reports to be transmitted on a physical uplink shared channel.

17. The method according to claim 13, further comprising setting the limit of resource blocks to be allocated to the downlink channel such that a center of the downlink channel is farthest away from the uplink frequency band.

18. The method according to claim 17, wherein the channel is a physical uplink shared channel, and wherein additionally a physical uplink control channel is not located at an edge of the uplink frequency band.

19. The method according to claim 11, wherein the limit is taken into account with at least one of the following only if it is not in conflict with other constraints for the allocation of the resource block to the channel:
- for a user equipment using the channel if a first predefined condition is fulfilled;
- for the channel if a second predefined condition is fulfilled; and
- for at least one of the uplink or the downlink if a third predefined condition is fulfilled.

20. A computer program product embodied on a non-transitory computer-readable medium, loadable into the internal memory of a computer, comprising program instructions which perform, when run on the computer, at least the following:
- scheduling in a wireless network in an uplink frequency band, a downlink frequency band, or both the uplink and the downlink frequency bands, according to a first telecommunication standard comprising allocating one or more resource blocks to an uplink channel, a downlink channel, or both the uplink or the downlink channels, respectively,
  - wherein the scheduling takes into account a limit of resource blocks to be allocated to the uplink or downlink channel;
  - wherein the limit is at least one of
    - an upper allowed resource block,
    - a lower allowed resource block, and
    - a lower limit of the number of resource blocks;
  - wherein the scheduling in the uplink frequency band takes into account reducing the maximum user equipment transmit power depending on the limit of resource blocks to be allocated to the uplink channel, and
  - wherein the limit of resource blocks to be allocated to the downlink channel is such that the resource allocation to the downlink channel does not comprise a resource block at a second frequency distance from a center of the uplink channel, wherein the second frequency distance is an integer multiple of a first frequency distance between the center of the uplink channel and an allocated resource block in the uplink frequency band; and
- communicating using the scheduled one or more resource blocks.

* * * * *